US012581013B2

(12) United States Patent
Bisht et al.

(10) Patent No.:  US 12,581,013 B2
(45) Date of Patent:  Mar. 17, 2026

(54) SYSTEM AND METHOD FOR ENABLING LAWFUL INTERCEPTION MANAGEMENT (LIM) INTEGRATION

(71) Applicant: JIO PLATFORMS LIMITED, Ahmedabad (IN)

(72) Inventors: Birendra Singh Bisht, Navi Mumbai (IN); Harbinder Pal Singh Saini, Navi Mumbai (IN); Anurag Sinha, Mumbai (IN); Nitin Ashok Warape, Navi Mumbai (IN); Amit Kumar Gupta, Mumbai (IN); Pravesh Aggarwal, New Delhi (IN)

(73) Assignee: JLO PLATFORMS LIMITED, Ahmedabad (IN)

( * ) Notice: Subject to any disclaimer, the term of this patent is extended or adjusted under 35 U.S.C. 154(b) by 339 days.

(21) Appl. No.: 18/247,506

(22) PCT Filed: Mar. 17, 2023

(86) PCT No.: PCT/IB2023/052626
§ 371 (c)(1),
(2) Date: Mar. 31, 2023

(87) PCT Pub. No.: WO2023/187539
PCT Pub. Date: Oct. 5, 2023

(65) Prior Publication Data
US 2025/0016265 A1      Jan. 9, 2025

(30) Foreign Application Priority Data
Mar. 30, 2022    (IN) ............................. 202221018952

(51) Int. Cl.
H04M 3/22 (2006.01)
H04M 3/42 (2006.01)
H04M 7/00 (2006.01)

(52) U.S. Cl.
CPC ....... H04M 3/2281 (2013.01); H04M 3/2218 (2013.01); H04M 3/42144 (2013.01); H04M 7/0021 (2013.01); H04M 7/0036 (2013.01)

(58) Field of Classification Search
None
See application file for complete search history.

(56) References Cited

U.S. PATENT DOCUMENTS

| 2012/0089747 | A1* | 4/2012 | Attanasio | ............... | H04L 63/30 709/246 |
| 2015/0127827 | A1* | 5/2015 | Imbimbo | ............... | H04L 43/10 709/224 |

(Continued)

OTHER PUBLICATIONS

International Search Report, PCT/IB2023/052626, mailed Jul. 10, 2023, Total pp. 04.

*Primary Examiner* — Antim G Shah
(74) *Attorney, Agent, or Firm* — FINNEGAN, HENDERSON, FARABOW, GARRETT & DUNNER, LLP

(57) ABSTRACT

The present disclosure enables lawful interception management (LIM) server integration with a centralized data layer (CDL) server and a converge telephony application server (CTAS). An X1 provisioning request from the LIM server is entertained at the CDL server and the LIM server determines details of the CDL server for target provisioning using an X1 interface. Further, an X2 interface is used by the CTAS to send data to the LIM server. If target is provisioned for interception, the CDL server will transfer X2 records towards LIM server, otherwise the CDL server will discard the data.

15 Claims, 8 Drawing Sheets

(56)           References Cited

U.S. PATENT DOCUMENTS

2017/0238152 A1 *    8/2017   Patel ..................... H04W 76/45
                                                    370/312
2018/0295556 A1 *   10/2018   Baek ....................... H04W 8/26
2019/0387397 A1 *   12/2019   Cao .......................... H04L 12/66
2021/0076260 A1 *    3/2021   Albasheir ............. H04W 12/80

* cited by examiner

350

CTAS APPLICATION
308

CALL RECEIVING AND PROCESSING  MODULE
352

SESSION MANAGEMENT MODULE
354

FAULT MANAGEMENT MODULE
356

CONFIGURATION AND PERFORMANCE MANAGEMENT MODULE
358

INFORMATION LOGGING AND DEBUGGING MODULE
360

SYSTEM AND METHOD FOR ENABLING LAWFUL INTERCEPTION MANAGEMENT (LIM) INTEGRATION

RESERVATION OF RIGHTS

FIELD OF INVENTION

The embodiments of the present disclosure generally relate to systems and methods for mobile communications technology. More particularly, the present disclosure relates to a system and a method for enabling lawful interception management (LIM) integration with converge telephony application server (CTAS) that reduces configuration errors in reporting critical data.

BACKGROUND OF INVENTION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

As per current regulatory requirements, a converge telephony application server (CTAS) node of a network provides lawful interception (LI) data on a user terminating gateway (UtGW) interface, generating and providing supplementary services to users. Typically, in cases where an application has more than one CTAS node in a super core, determination of the LI critical data becomes cumbersome, tedious, and is prone to configuration mistakes and errors.

There is, therefore, a need in the art to provide a system and a method that can mitigate the problems associated with the prior arts.

OBJECTS OF THE INVENTION

Some of the objects of the present disclosure, which at least one embodiment herein satisfies are listed herein below.

It is an object of the present disclosure to provide a system and a method that provides integration of a lawful interception management (LIM) server with a converge telephony application server (CTAS) server for provisioning and receiving data from a target identity for interception.

It is an object of the present disclosure to provide a system and a method that provides a centralized data layer (CDL) server that acts as an application programming interface (API) to client application services for accessing centralized data.

It is an object of the present disclosure to provide a system and a method that facilitates the LIM server to use a primary interface to transmit user communication requests to the CDL server.

It is an object of the present disclosure to provide a system and a method that facilitates the LIM server to use a secondary interface to receive the approved one or more communication requests from the CDL server.

It is an object of the present disclosure to provide a robust system and a method for integration of lawful interception management.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for enabling one or more connections. A converge telephony application server (CTAS) may be operatively coupled with a lawful interception management server (LIMS). The CTAS may include one or more processors and a memory that stores instructions to be executed by the one or more processors. The LIMS may receive one or more communication requests from the CTAS. The one or more communication requests may be based on one or more subscriber inputs received by the CTAS from one or more user devices via a network. The LIMS may transmit the one or more communication requests to a centralized data layer (CDL) server. The CDL server may be configured to approve the one or more communication requests. The LIMS may receive the approved one or more communication requests from the CDL server and enable the one or more connections between the one or more user device and the CTAS based on the approved one or more communication requests.

In an embodiment, the LIMS may be configured to use a primary interface to transmit the one or more communication requests to the CDL server.

In an embodiment, the primary interface may utilize a representational state transfer (ReST) interface over hypertext transfer protocol secure (HTTPS) for transmitting the one or more communication requests to the CDL server.

In an embodiment, the LIMS may be configured to use a secondary interface to receive the approved one or more communication requests from the CDL server.

In an embodiment, the secondary interface may be configured to use one or more file transfer protocol (FTP) servers for receiving the approved one or more communication requests from the CDL server.

In an embodiment, the CDL server may be configured to use a database to record the approved one or more communication requests based on an inability of transmission by the secondary interface.

In an embodiment, the CTAS may be configured to process the one or more communication requests and enable one or more service chain logic executions associated with the received one or more communication requests.

In an embodiment, the CTAS may be configured to manage at least one o, a fault, a configuration, and a performance associated with the one or more communication requests.

In an embodiment, the primary interface may be configured to utilize one or more internet protocols (IPs) and one or more port information from the CDL server for transmitting the one or more communication requests to the CDL server.

In an aspect, the present disclosure relates to a method for enabling one or more connections. The method may include receiving, by a lawful interception management server (LIMS), one or more communication requests from a converge telephony exchange server (CTAS). The one or more communication requests may be based on one or more subscriber inputs received by the CTAS from one or more user devices via a network. The method may include transmitting, by the LIMS, the one or more communication requests to a CDL server. The CDL server may be configured to approve the one or more communication requests. The method may include receiving, by the LIMS, the approved one or more communication requests from the CDL server and enabling the one or more connections between the one or more user devices and the CTAS based on the approved one or more communication requests.

In an embodiment, the method may include using, by the LIMS, a primary interface for transmitting the one or more communication requests to the CDL server.

In an embodiment, the method may include utilizing. by the primary interface. one or more internet protocols (IPs) and one or more port information from the CDL server for transmitting the one or more communication requests to the CDL server.

In an embodiment, the method may include using, by the LIMS, a secondary interface for receiving the approved one or more communication requests from the CDL server.

In an aspect, the present disclosure relates to a user equipment (UE) for enabling one or more connections. One or more processors of the UE may be communicatively coupled to one or more processors of a lawful interception management server (LIMS) in a system. The one or more processors of the UE may be coupled with a memory that stores instructions to be executed by the one or more processors and may cause the UE to transmit one or more communication requests to a converge telephony application server (CTAS) via a network. The LIMS may receive the one or more communication requests from the CTAS. The one or more communication requests may be based on one or more subscriber inputs received by the CTAS from the UE via the network. The LIMS may transmit the one or more communication requests to a CDL server. The CDL server may approve the one or more communication requests. The LIMS may receive the approved one or more communication requests from the CDL server and enable the one or more connections between the UE and the CTAS based on the approved one or more communication requests.

In an aspect, the present disclosure relates to a non-transitory computer-readable medium including processor-executable instructions by a processor to receive one or more communication requests from a converge telephony exchange server (CTAS), where the one or more communication requests are based on one or more subscriber inputs received by the CTAS from one or more user devices via a network, transmit the one or more communication requests to a centralized data layer (CDL) server, where the CDL server is configured to approve the one or more communication requests, and receive the approved one or more communication requests from the CDL server and enable the one or more connections between the one or more user devices and the CTAS based on the approved one or more communication requests.

BRIEF DESCRIPTION OF DRAWINGS

The accompanying drawings, which are incorporated herein, and constitute a part of this disclosure, illustrate exemplary embodiments of the disclosed methods and systems which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 1:
FIG. 1 illustrates an exemplary network architecture (100) of a proposed system, in accordance with an embodiment of the present disclosure.
Figure 1:
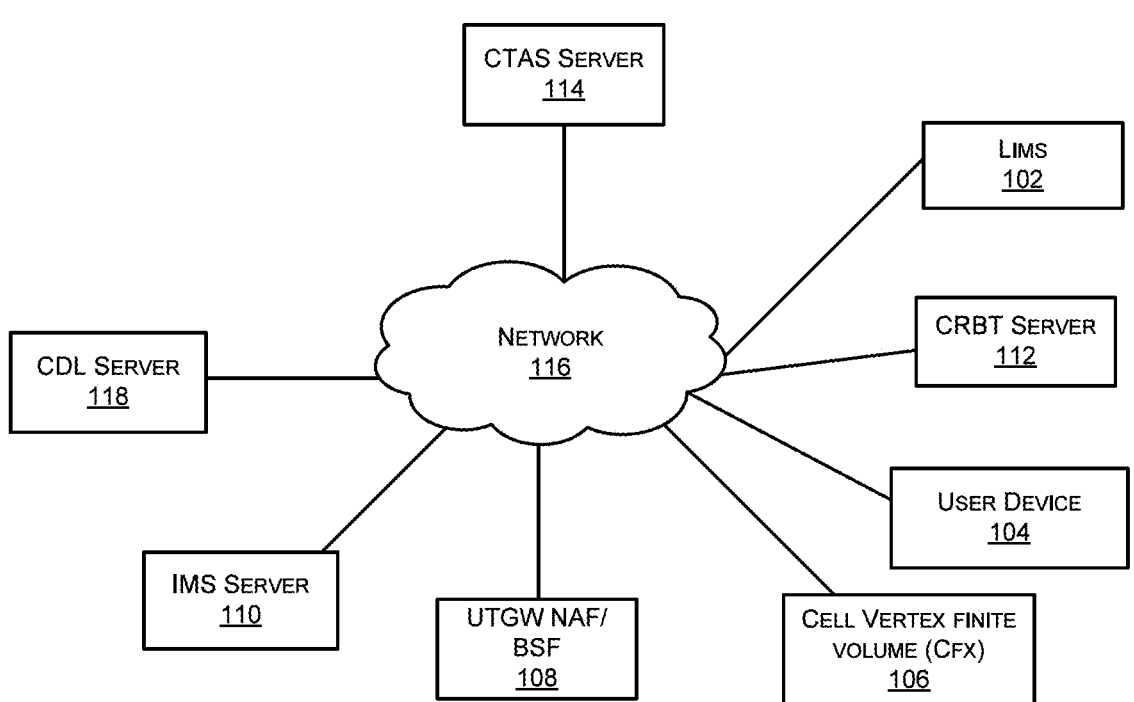

The foregoing shall be more apparent from the following more detailed description of the disclosure.

BRIEF DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the disclosure. As used herein, the singular forms "a", "an", and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The various embodiments throughout the disclosure will be explained in more detail with reference to FIGS. 1-6.

The present solution may place session initiation protocol (SIP) application servers (e.g. converge telephony application server (CTAS)) at the centre of a voice core network, managing connectivity between subscribers and implementation of supplementary services. Ro interface based online charging may be implemented in telecommunication network and call data records (CDRs) generated by application servers, such as the CTAS, may be used by a mediation system for reconciliation purpose. With respect to CTAS deployment architecture, multiple CTAS clusters, having various CTAS instances may be used to serve traffic of a single circle and each of the circles may have an assigned personal single centralized data layer (CDL) module. As multiple CTAS instances are represented in the cluster, a need for determining internet protocol (IP) address of multiple CTAS instances for the circle may be evaded. Further, the CDL module may connect to the CTAS through an IP of their associated CTAS cluster thereby leading to effective utilization of network resources.

FIG. 1 illustrates an exemplary network architecture (100) of a proposed system, in accordance with an embodiment of the present disclosure.

As illustrated in the network architecture (100) in FIG. 1, a CTAS (114) may be utilized by a user equipment (UE) (104) for voice based services. Various functional components integrated with the CTAS (114) may include, but not be limited to, a cell vertex finite volume (CFX), a user terminating gateway (UtGW) (108), a caller ring back tone (CRBT) server (112), a lawful interception management server (LIMS) (102), an internet protocol multimedia subsystem (IMS) server (110), and a CDL server (118). A person with ordinary skill in the art will understand that the UE (104) may be interchangeably termed as one or more user devices (104).

In an embodiment, the CTAS (114) may be configured as an application server and may be communicably operational or may be integrated with a voice over long term evolution (VOLTE) handset via a network (116). A person with ordinary skill in the art may understand that the UE (104) may include the VOLTE handset and may be connected to the CTAS (114) through the network (116). VOLTE may support 5G long term evolution (LTE) devices and voice over LTE may be enabled when a carrier allows a user to place a call over an LTE connection instead of older legacy voice networks.

In an embodiment, the CTAS (114) may be operatively configured to the CFX (106) via the network (116). The CFX (106) may offer session and service control while using standard interfaces and application triggering mechanisms. Further, the CTAS (114) may be operatively configured, via the network (116) to the UtGW (108) that may further include a network application function (NAF) and a bootstrapping service function (BSF). The NAF may constitute a hypertext transfer protocol (HTTP) or a hypertext transfer protocol (HTTPS) based service that requires authentication. Further, the BSF may be an authenticator against which the UE (104) has to perform authentication. Furthermore, the CTAS (114) may be communicably operational or may be integrated with the IMS server (110) via the network (116). Typically, application servers execute and host services within the IMS server (110) and an IMS application server may provide specific services to an end user. The specific services may include, but not be limited to, multi-party gaming, videoconferencing, messaging, community services, presence, and content sharing. Depending on its implementation, the IMS application server may host one or many IMS applications.

In an embodiment, the CTAS (114) may also be operatively configured to the CRBT server (112). The CRBT server (112) may provide a service that allows customization of ring back tone on the UE (104). Further, the LIMS server (102) may enable lawful interception (LI). The LI may be a security process where a service provider or a network operator may collect and provide intercepted communications occurring within a wireless network (116).

In an embodiment, the CTAS (114) may be configured to communicate with the CDL server (118). The CDL server (118) may be responsible for receiving data access requests from a CDL agent and may interface with a services layer which responds to data access requests. The CDL agent and the CDL server (118) may act as a backbone for providing transporting of services between a client side and a server side.

Further, the UE (104) may include, but not be limited to, a mobile, a laptop, etc. Further, the UE (104) may include one or more in-built or externally coupled accessories including, but not limited to, a visual aid device such as a camera, audio aid, microphone, or keyboard. The UE (104) may include a mobile phone, smartphone, virtual reality (VR) devices, augmented reality (AR) devices, a laptop, a general-purpose computer, a desktop, personal digital assistants, a tablet computer, and a mainframe computer. Additionally, input devices for receiving input from a user such as a touchpad, touch-enabled screen, electronic pen, and the like may be used. A person of ordinary skill in the art will appreciate that the UE (104) may not be restricted to the mentioned devices and various other devices may be used.

In an embodiment, the network (116) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. The network (116) may also include, by way of example but not limitation, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof.

Although FIG. 1 shows exemplary components of the network architecture (100), in other embodiments, the network architecture (100) may include fewer components, different components, differently arranged components, or additional functional components than depicted in FIG. 1. Additionally, or alternatively, one or more components of the network architecture (100) may perform functions described as being performed by one or more other components of the network architecture (100).

Figure 2:
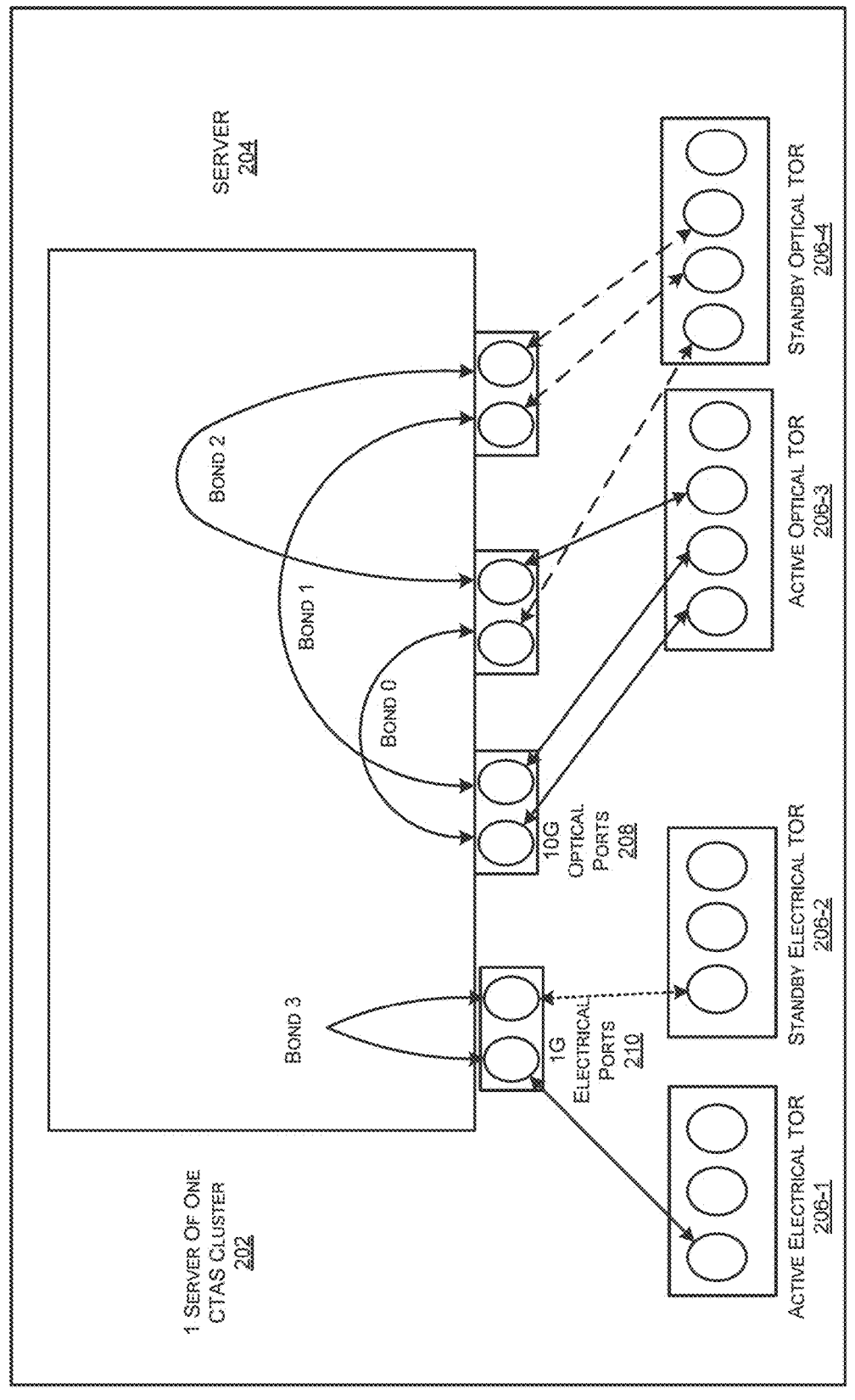
FIG. 2 illustrates network elements (200) of a converge telephony application server (CTAS), in accordance with an embodiment of the present disclosure.

FIG. 2 illustrates network elements (200) of a CTAS server, in accordance with an embodiment of the present disclosure.

As illustrated in FIG. 2, CTAS may be an application server that is capable of handling VOLTE, machine to machine (M2M), fixed-line (FLP), and enterprise subscribers simultaneously. This makes CTAS a unique type of telephony application server (TAS), which gives operational and engineering advantage in managing a subscriber's growth in the VOLTE, fixed, and/or enterprise domain in the most efficient way. Further, CTAS may support online and offline charging for subscribers. However, Ro interface based online charging may be implemented in a network. CDRs generated by the CTAS may be used by a mediation system for reconciliation purposes.

In an embodiment, the CTAS server (202) may be implemented as a CTAS application solution in a system. Further, the CTAS application solution may be a cluster-based solution that can be hosted on multiple servers. Each server (202) may have four logical interfaces, for example, Bond0, Bond1, Bond2, and Bond3, where each Bond may be logically paired to two ethernet ports to achieve link level redundancy. Bond0 interface may be used by all eight blades for internal and database communications. Bond1 interface may be used by session initiation protocol (SIP) applications present in all eight servers for SIP signaling. Bond2 interface may be used for diameter communication by applications present in Blade3 onwards (From Blade3 to Blade8), whereas Bond3 interface is used for communication with element management system.

For Bond0, Bond1, and Bond2, 10G optical network interface cards (NIC) may be used, whereas for Bond3, 1G electrical NIC cards may be used. Also, CTAS (202) may support both IPv4 and IPv6 protocols, where Bond2 and Bond3 interfaces may listen on either IPv6 or IPv4 at a given point of time. Further, Bond1 interface may listen on IPv4 and IPv6 at the same time. Bond0 interface, which is not used for any external communication, may support only IPv4. Since all elements in current ecosystem do not have IPv6 support and are currently in an initial phase of deployment, CTAS (202) may use IPv4 protocol.

Figure 3A:
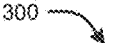
FIG. 3A illustrates an exemplary representation (300) of the CTAS server, in accordance with an embodiment of the present disclosure.
Figure 3A:
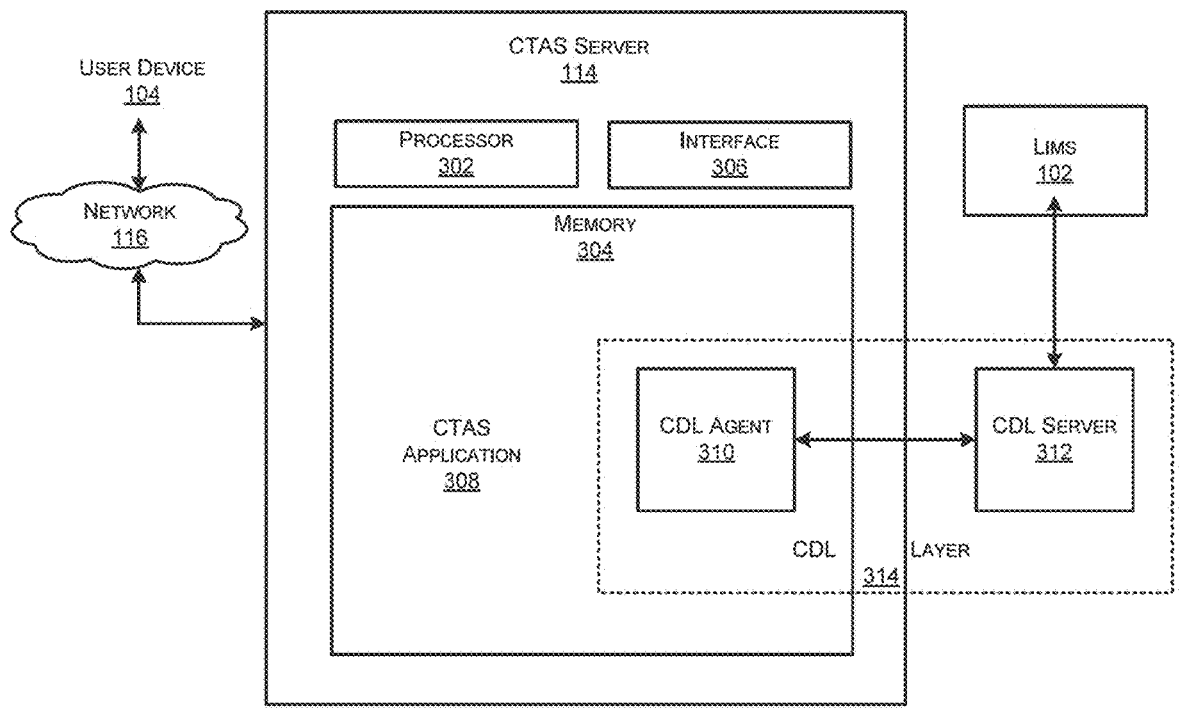

FIG. 3A illustrates an exemplary representation (300) of a CTAS (114), in accordance with an embodiment of the present disclosure. The exemplary representation (300) may include the CTAS (114) with one or more processor(s) (302) coupled with a memory (304). The memory (304) may store instructions which when executed by the one or more processor(s) (302) may cause a proposed system to perform the steps as described herein. The CTAS server (114) may cause the system to receive, through an IMS server (110), a request from the UE (104). The request may relate to determining IP of a CTAS circle which in turn may be used to evaluate whether a CTAS node present within the CTAS circle is provisioned for interception.

In an embodiment, the memory (304) may include a CTAS application (308). The CTAS application (308) may include client application services trying to access centralized data. Further, the CTAS (114) may access the CDL server (312) through a CDL agent (310). A CDL layer (314) may include the CDL agent (310) and the CDL server (312). A person ordinary skilled in the art may understand that the CDL server (312) may be similar to the CDL server (118) of FIG. 1 in its functionality.

The CDL agent (310) and the CDL server (312) together execute as a "Client Server" communication model. The CDL agent (310) may provide an API interface to client application services trying to access the centralized data. Multiple services may integrate with the CDL agent (310). The CDL agent (310) may maintain a transmission control protocol (TCP) connection with the CDL server (312) and may select CDL server destination IP based on service routing requirements.

The CDL server (312) may receive data access requests from the CDL agent (310). The CDL agent (310) may interface with the CDL layer (314) for connecting to the CDL server (312). The CDL server (312) may in turn respond to the data access requests received from the CDL agent (310). Both the CDL agent (310) and the CDL server (312) provide a backbone transport between services present at a client side and a server side respectively. The CDL server (312) may be communicatively connected to an LIM server (102). In an embodiment, X1 provisioning request from the LIM server (102) may be entertained in the CDL layer (314). For entertaining this request, the LIM server (102) may need details, for example, IP and Port of the CDL server (312). In another embodiment, configuration related data of the LIM server (102) may be provided at the CDL layer (314) during installation and commissioning of provisioning of target identity or may be configured using a command-line interference (CLI).

The CTAS (114) may also comprise an interface(s) (306). The interface(s) (306) may comprise a variety of interfaces, for example, interfaces for data input and output devices, referred to as input/output (I/O) devices, storage devices, sensors, and the like. The interface(s) (306) may facilitate communication of the CTAS (114) with various devices coupled to it. The interface(s) (306) may also provide a communication pathway for one or more components of the CTAS server (114).

The one or more processors (302) may be implemented as a combination of hardware and programming (for example, programmable instructions) to implement one or more functionalities of the one or more processors (302). In examples described herein, such combinations of hardware and programming may be implemented in several different ways. For example, the programming for the one or more processors (302) may be processor-executable instructions stored on a non-transitory machine-readable storage medium and the hardware for the one or more processors (302) may comprise a processing resource (for example, one or more processors), to execute such instructions. In the present examples, the machine-readable storage medium may store instructions that, when executed by the processing resource, implement the one or more processors (302). In such examples, the CTAS server (114) may comprise machine-readable storage medium storing instructions and the processing resource to execute the instructions, or the machine-readable storage medium may be separate but accessible to the CTAS (114) and the processing resource. In other examples, the one or more processors (302) may be implemented via electronic circuitry.

In an embodiment, one or more processors (302) may be operatively coupled with a LIMS (102).

In an embodiment, the LIMS (102) may receive one or more communication requests from the CTAS (114). The one or more communication requests may be based on one or more subscriber inputs received by the CTAS (114) from one or more user devices (104) via a network (116). Further, the LIMS (102) may transmit the received one or more communication requests to a CDL server (118). The CDL server (118) may be configured to approve the received one or more communication requests. Further, the LIMS (102) may receive the approved one or more communication requests from the CDL server (118) and enable one or more connections between the one or more user devices (104) and the CTAS (114) based on the approved one or more communication requests.

In an embodiment, the LIMS (102) may be configured to use a primary interface to transmit the received one or more communication requests to the CDL server (118). Further, the primary interface may utilize a representational state transfer (ReST) interface over hypertext transfer protocol secure (HTTPS) for transmitting the received one or more communication requests to the CDL server (118).

In an embodiment, the primary interface may be configured to utilize one or more IPs and one or more port information from the CDL server (118) for transmitting the received one or more communication requests to the CDL server (118).

In an embodiment, the LIMS (102) may be configured to use a secondary interface to receive the approved one or more communication requests from the CDL server (118). Further, the secondary interface may be configured to use one or more file transfer protocol (FTP) servers for receiving the approved one or more communication requests from the CDL server (118).

Figure 3B:
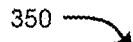
FIG. 3B illustrates exemplary functional components (350) of a CTAS application, in accordance with an embodiment of the present disclosure.

FIG. 3B illustrates exemplary functional components (350) of a CTAS application (308), in accordance with an embodiment of the present disclosure.

The CTAS application (308) may include a call receiving and processing module (352), a session management module (354), a fault management module (356), a configuration and performance management module (358), and an information logging and debugging module (360).

In an embodiment, the call receiving and processing module (352) may provide services related to, for example, record telephone calls and data transfers (short message services (SMS), multimedia messaging service (MMS), etc.). Core functionalities of the call recording and the processing module (352) may include provisioning, network triggering, announcement, recording, encryption, storage, and retrieval.

In an embodiment, the session management module (354) may act as a core functional delivery module, which may be responsible for call processing and service chain logic execution. Tasks of handling SIP, HTTP, and Diameter messages may be managed by the session management module (354). For using a CDL layer (314), a session manager of the session management module (354) may interact with a database and provide necessary information required by the CDL agent (310).

In an embodiment, the fault management module (356) may perform operations and maintenance touch points for the system. The fault management module (356) may be integrated with operation support systems/business support systems (OSS/BSS) on the REST interface.

In an embodiment, the configuration and performance management module (358) may monitor fault, configuration, and performance aspects of the CTAS (114). The performance management module (358) may also provide operations and maintenance touch points for the CTAS (114) as described in FIG. 1.

In an embodiment, the information logging and debugging module (360) may be used to aggregate logs and debug information from all functional managers for troubleshooting. The information logging and debugging module (360) may provide flexibilities to generate debug information that may be defined module wise, process wise, system wise, and the like.

Figure 4:
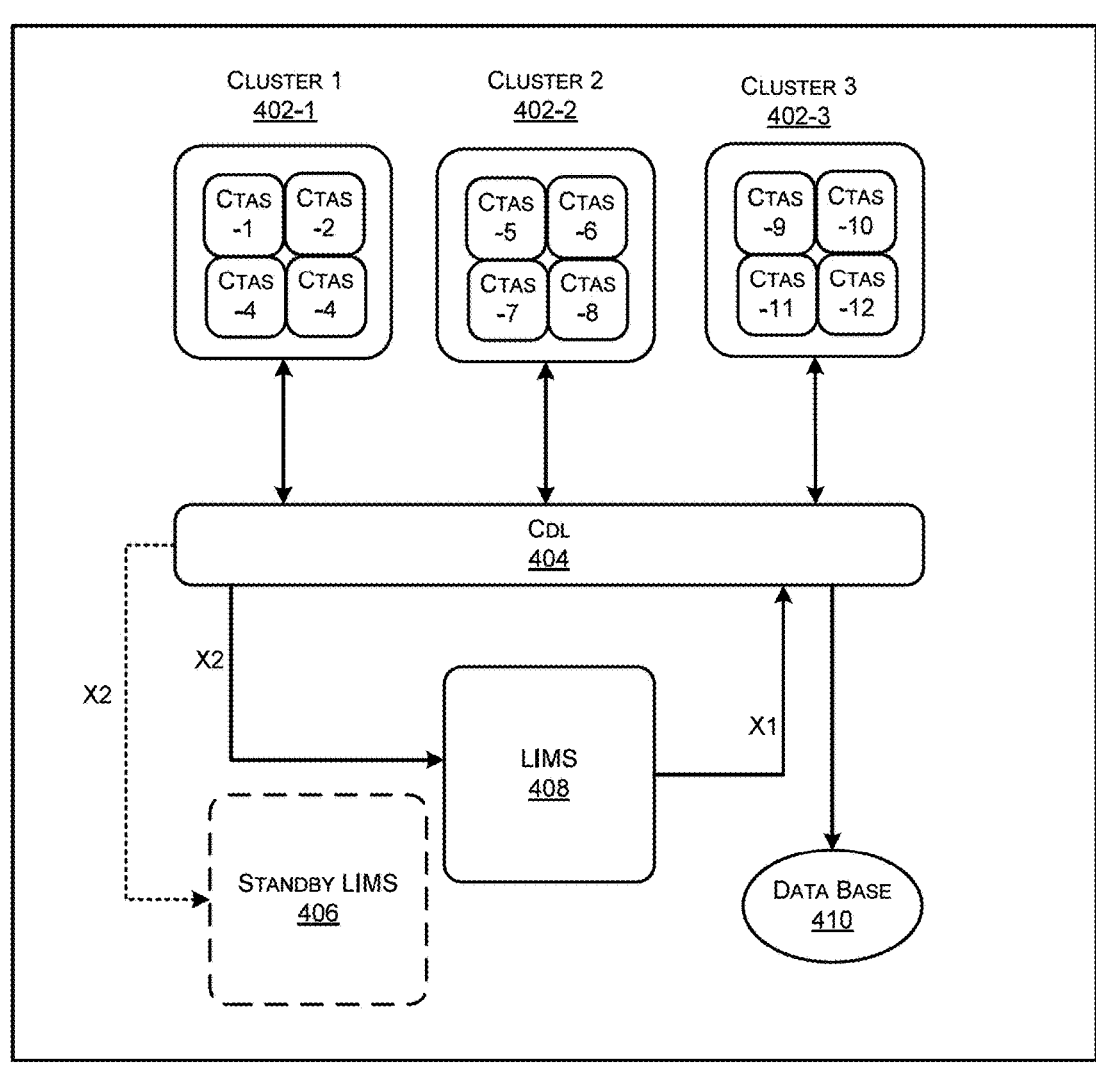
FIG. 4 illustrates an exemplary structural representation (400) of a centralized data layer (CDL) framework, in accordance with an embodiment of the present disclosure.

FIG. 4 illustrates an exemplary structural representation (400) of a CDL framework, in accordance with an embodiment of the present disclosure.

In an embodiment, multiple CTAS clusters (401-2, 402-2, 402-3) may be used to serve traffic of a single circle and each circle may have its own single CDL module in a super core. Each of the CTAS clusters, for example, cluster 1 (402-1), cluster 2 (402-2), and cluster 3 (402-3) may contain multiple number of CTAS instances, for example, CTAS-1 instance, CTAS-2 instance, CTAS-3 instance, and CTAS-4 instance. As may be appreciated, each of the clusters may contain additional CTAS instances and may not be limited to a specific number as depicted in FIG. 4.

Multiple CTAS clusters arranged in a cluster may be connected to a CDL (404). X1 provisioning request from an LIM server (408) may be entertained in the CDL (404). The LIM server (408) may require details of a CDL server which is a component of the CDL (404) where X1 provisioning is to be done. The details may be related to, for example, IP information and port information. At the CDL (404), configuration related data of the LIM server (408) may be provided during installation and commissioning. Additionally, the LIM server (408) may be configured to use a cross link interference (CLI). In an implementation, X1 provisioning may be performed using ReST interface over HTTPS and operations/messages may be supported at CTAS (CDL agent) for X1 provisioning. This may include performing operations such as, but not limited to, adding target, deleting target, deleting all targets, viewing target, and viewing all targets. In another implementation, the CTAS clusters (402-1, 402-2, 402-3) may send data to the LIM server (408) via an X2 interface.

In an embodiment, irrespective of whether a UE is provisioned as LI target, CTAS may send UtGW interface data towards the CDL (404). If targeted UE is provisioned for interception, the CDL (404) may transfer X2 records to the LIM server (408), else CDL (404) may discard the data. Further, if FTP operation fails due to a primary server unavailability, then transfer of X2 records may be re-attempted via a standby LIM server (406) (i.e., secondary FTP server). If both the primary and the secondary servers are unavailable, then all failed records may be buffered and stored in a database (410). On expiry of buffer timings, the CTAS clusters (402-1, 402-2, 402-3) may have an option to clear data from the database (410).

Figure 5A:
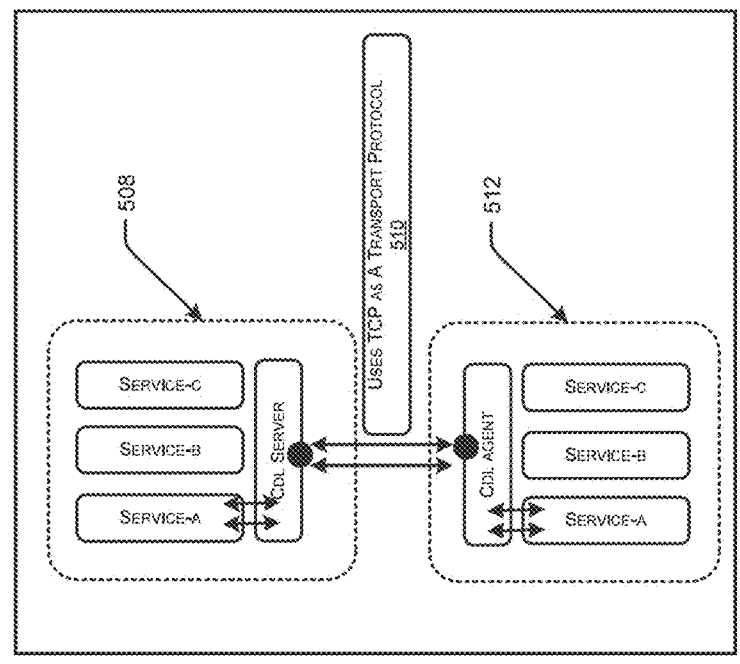
FIGS. 5A-5B illustrate exemplary functioning of the CDL framework (500, 550), in accordance with an embodiment of the present disclosure.
Figure 5A:
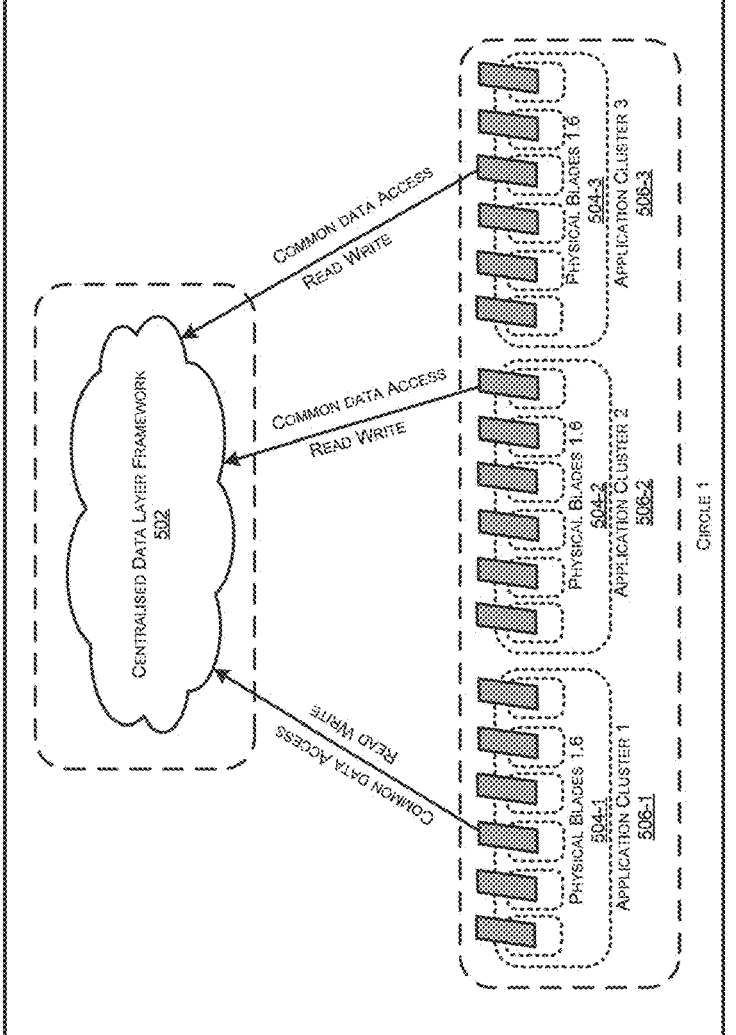
Figure 5B:
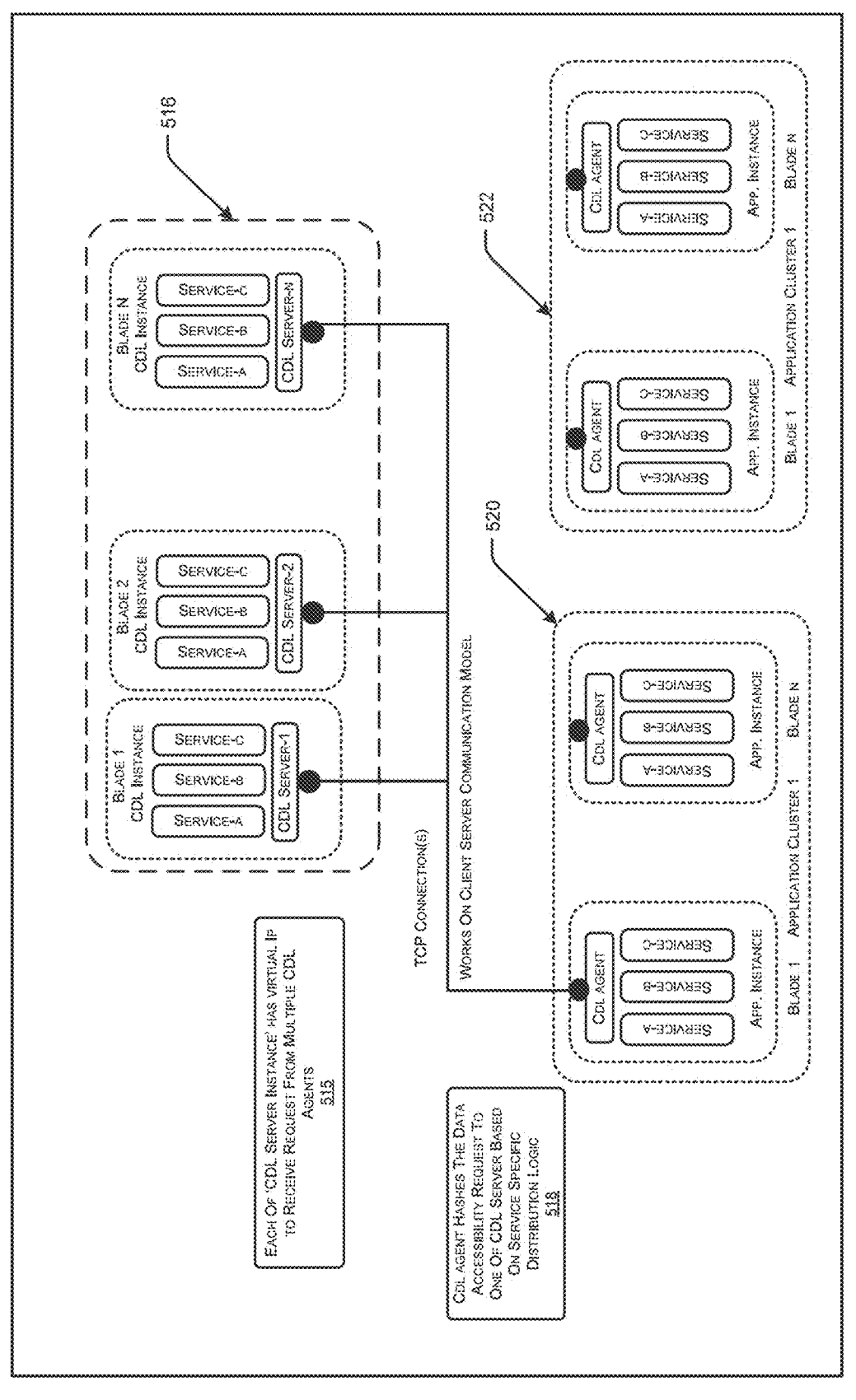

FIGS. 5A-5B illustrate exemplary CDL working frameworks (500, 550), in accordance with an embodiment of the present disclosure. As per a CTAS deployment architecture and with respect to FIG. 5A, multiple CTAS clusters may be used to serve traffic of a single circle, for example, multiple CTAS clusters may serve traffic of circle 1. Further, each of the circles may have its own single CDL module in a super core. A CDL framework (502) may work on a "client-server" communication model and may consist of a "CDL agent" and a "CDL server" that interfaces with a service logic layer. CDL agent (512) present in application clusters, for example, application cluster 1 (506-1), application cluster 2 (506-2), and application cluster 3 (506-3), may communicate with the respective CDL server (508) present in physical blades for example, physical blades (504-1, 504-2, 504-3) through the CDL framework (502). Further, the CDL agent (512) may provide an application programming interface (API) to client application services for accessing centralized data. One or more services, for example, service-A, service-B, and service-C, associated with the CDL server (508) may maintain, via transmission control protocol (TCP) (510) one or more connections with the CDL agent (512). A connection with respective services, for example, service-A, service-B, and service-C, at the CDL agent (512) may be provided. The CDL agent (512) may select one of the CDL server destinations IP based on service routing requirements. In an embodiment, the CDL server (508) may be responsible for interfacing with the CDL layer (502) and may respond to a data access request as received from the CDL agent (512).

In another embodiment, the CDL agent (512) and the CDL server (508) may primarily act as a backbone for transporting information between services present both at a client side and a server side respectively. To utilize the CDL framework (502), a new service may have to register itself with the CDL client and the CDL server (508) so that the CDL framework (502) may route data access request/responses appropriately to correct service modules.

With respect to FIG. 5A, the application instance running on server-1 of an application cluster may have three services named A, B and C which intend to use the CDL framework (502). The CDL agent may be connected to one or multiple CDL server end points and based on service specific routing logic, service data access request may be directed to either CDL Server-1 IP or Server-2 IP. The CDL server instance may expose virtual IP to CDL agents and may work in redundant mode so that CDL server instance is highly available.

As is shown in FIG. 5A, client application services may interact with the CDL framework (502) using generic APIs. These generic APIs may also provide service specific call back function which can be overloaded when there are service specific routing requirements. The CDL agent (512) may be aware of a set of CDL servers (508) to which it is connected and may send data access request to the CDL server (508) using CDL framework primitives. The CDL server (508), on receiving the data access, may invoke service level call back so that appropriate handling may be performed. Depending upon the service requirements, data access request may or may not require response from the CDL server (508). A requirement to receive a response or not receive a response may be communicated to the CDL agent (512) during an API invocation, based on which the CDL framework (502) may further handle the data access call flow. If a response is required by the client application services, then a CDL service may respond with a response, which may be sent to the CDL agent (512) by the CDL server (508). The CDL agent (512), on receiving the response, may send a reply to a pre-determined service address.

With respect to FIG. 5B, the CDL agent of an application cluster 1 (520) may connect to the CDL server 1 (516), via a TCP connection. Similarly, the CDL agent of an application cluster 2 (522) may connect to the CDL server 2 (516) and so on via TCP connections.

In an embodiment, the CDL agent (512) and the CDL server (508) may communicate via a communication model using their own predefined header-body format. The header may be fixed in size and may contain one or more important information fields. This may be required to route a data access request and response. Further, the body may be variable in size and may depend upon a service type and corresponding various data access requests types.

In an embodiment, the CDL agent (512) may hash the data accessibility request to the CDL server (508) based on specific distribution logic (518). With respect to this, each of the CDL server instances may have a virtual IP to receive a request from multiple CDL agents (515).

By way of an example, a service-A at the CDL agent may require an insert, an update, a delete, and a view data access operation, which may have variable body size requirements. It may be noted that the CDL framework may be totally transparent to semantics and syntactic construct of service data access request with "actual data." The service data may be transported between the CDL agent and the CDL server in the form of a buffer and may be encoded/decoded by a service layer only.

Figure 6:
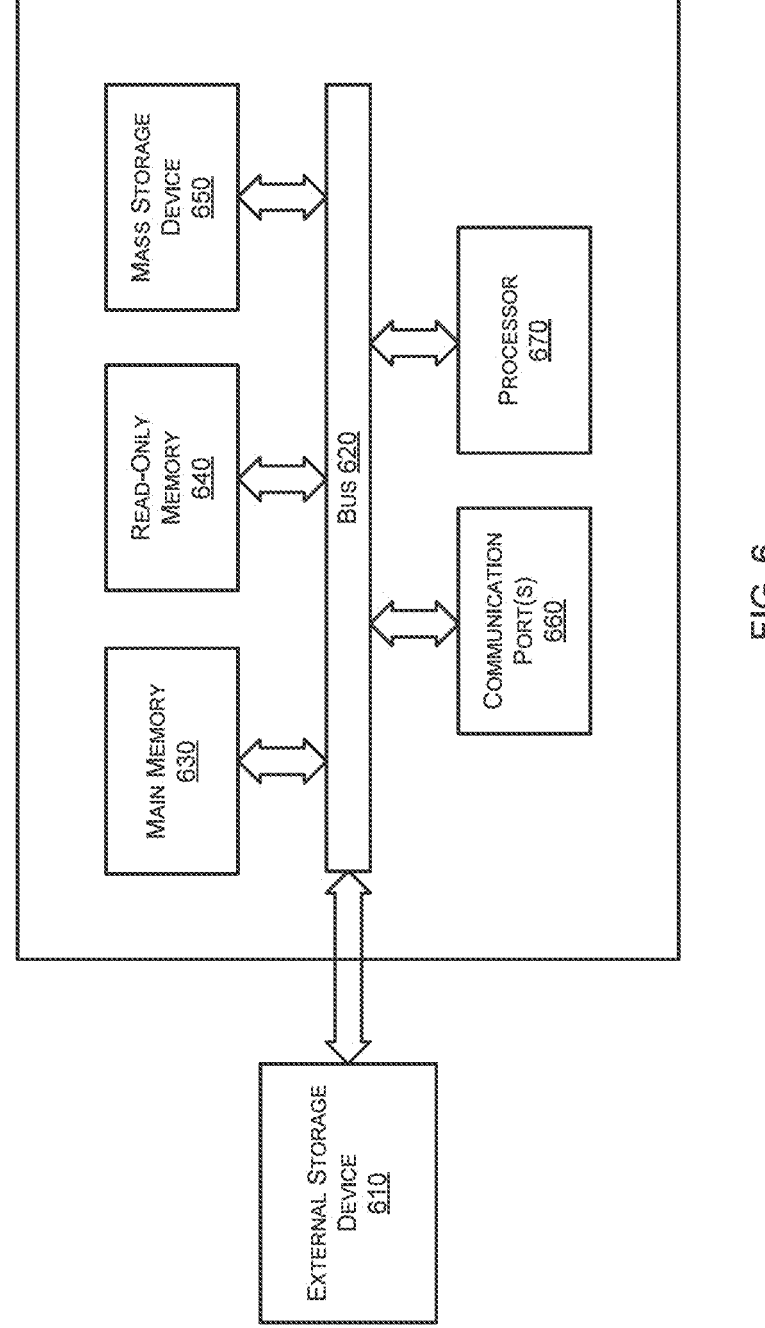
FIG. 6 illustrates an exemplary computer system (600) in which or with which a proposed system may be implemented, in accordance with an embodiment of the present disclosure.

FIG. 6 illustrates an exemplary computer system (600) in which or with which the proposed system may be implemented, in accordance with an embodiment of the present disclosure.

As shown in FIG. 6, the computer system (600) may include an external storage device (610), a bus (620), a main memory (630), a read-only memory (640), a mass storage device (650), a communication port(s) (660), and a processor (670). A person skilled in the art will appreciate that the computer system (600) may include more than one processor and communication ports. The processor (670) may include various modules associated with embodiments of the present disclosure. The communication port(s) (660) may be any of an RS-232 port for use with a modem-based dialup connection, a 10/100 Ethernet port, a Gigabit or 10 Gigabit port using copper or fiber, a serial port, a parallel port, or other existing or future ports. The communication ports(s) (660) may be chosen depending on a network, such as a Local Area Network (LAN), Wide Area Network (WAN), or any network to which the computer system (500) connects.

In an embodiment, the main memory (630) may be Random Access Memory (RAM), or any other dynamic storage device commonly known in the art. The read-only memory (640) may be any static storage device(s) e.g., but not limited to, a Programmable Read Only Memory (PROM) chip for storing static information e.g., start-up or basic input/output system (BIOS) instructions for the processor (670). The mass storage device (650) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces).

In an embodiment, the bus (620) may communicatively couple the processor (670) with the other memory, storage, and communication blocks. The bus (620) may be, e.g. a Peripheral Component Interconnect PCI)/PCI Extended (PCI-X) bus, Small Computer System Interface (SCSI), USB, or the like, for connecting expansion cards, drives, and other subsystems as well as other buses, such a front side bus (FSB), which connects the processor (670) to the computer system (600).

In another embodiment, operator and administrative interfaces, e.g., a display, keyboard, and cursor control device may also be coupled to the bus (620) to support direct operator interaction with the computer system (600). Other operator and administrative interfaces can be provided through network connections connected through the communication port(s) (660). Components described above are meant only to exemplify various possibilities. In no way should the aforementioned exemplary computer system (600) limit the scope of the present disclosure.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter is to be implemented merely as illustrative of the disclosure and not as a limitation.

Advantages of the Invention

The present disclosure provides a system and a method that provides integration of a lawful interception management (LIM) server with a converge telephony application server (CTAS) server for provisioning and receiving data from a target identity for interception.

The present disclosure provides a system and a method that provides a common data layer (CDL) server that acts as an application programming interface (API) to client application services for accessing centralized data.

The present disclosure provides a system and a method that facilitates the LIM server to use a primary interface to transmit user communication requests to the CDL server.

The present disclosure provides a system and a method that facilitates the LIM server to use a secondary interface to receive the approved one or more communication requests from the CDL server.

The present disclosure provides a robust system and a method for integration of lawful interception management.

The present disclosure provides a system and a method for advanced communication system.

We claim:

1. A system for enabling one or more connections, the system comprising:
   one or more user devices;
   a lawful interception management server (LIMS);
   a convergence telephony exchange server (CTAS), wherein the CTAS comprises one or more processors operatively coupled with the LIMS, wherein the one or more processors are coupled with a memory, wherein said memory stores processor-executable instructions, and wherein the LIMS is configured to:
   receive one or more communication requests from the CTAS, wherein the one or more communication requests are based on one or more subscriber inputs received by the CTAS from the one or more user devices via a network;
   transmit the one or more communication requests to a centralized data layer (CDL) server, wherein the CDL server is configured to approve the one or more communication requests; and
   receive the approved one or more communication requests from the CDL server and enable the one or more connections between the one or more user devices and the CTAS based on the approved one or more communication requests.

2. The system as claimed in claim 1, wherein the LIMS is configured to use a primary interface to transmit the one or more communication requests to the CDL server.

3. The system as claimed in claim 2, wherein the primary interface utilizes a representational state transfer (ReST) interface over hypertext transfer protocol secure (HTTPS) for transmitting the one or more communication requests to the CDL server.

4. The system as claimed in claim 1, wherein the LIMS is configured to use a secondary interface to receive the approved one or more communication requests from the CDL server.

5. The system as claimed in claim 4, wherein the secondary interface utilizes one or more file transfer protocol (FTP) servers for receiving the approved one or more communication requests from the CDL server.

6. The system as claimed in claim 5, wherein the CDL server is configured to use a database to record the approved one or more communication requests based on an inability of transmission by the secondary interface.

7. The system as claimed in claim 1, wherein the CTAS is configured to process the one or more communication requests and enable one or more service chain logic executions associated with the one or more communication requests.

8. The system as claimed in claim 1, wherein the CTAS is configured to manage at least one of: a fault, a configuration, and a performance associated with the one or more communication requests.

9. The system as claimed in claim 2, wherein the primary interface is configured to utilize one or more internet protocols (IPs) and one or more port information from the CDL server for transmitting the one or more communication requests to the CDL server.

10. A method for enabling one or more connections, the method comprising:

receiving, by a lawful interception management server (LIMS), one or more communication requests from a converge telephony exchange server (CTAS), wherein the one or more communication requests are based on one or more subscriber inputs received by the CTAS from one or more user devices via a network;

transmitting, by the LIMS, the one or more communication requests to a centralized data layer (CDL) server, wherein the CDL server is configured to approve the one or more communication requests; and receiving, by the LIMS, the approved one or more communication requests from the CDL server and enabling the one or more connections between the one or more user devices and the CTAS based on the approved one or more communication requests.

11. The method as claimed in claim 10, comprising using, by the LIMS, a primary interface for transmitting the one or more communication requests to the CDL server.

12. The method as claimed in claim 11, comprising utilizing, by the primary interface, one or more internet protocols (IPs) and one or more port information from the CDL server for transmitting the one or more communication requests to the CDL server.

13. The method as claimed in claim 11, comprising using, by the LIMS, a secondary interface for receiving the approved one or more communication requests from the CDL server.

14. A user equipment for enabling one or more connections, said UE comprising:

one or more processors communicatively coupled to a lawful interception management server (LIMS) in a system, wherein the one or more processors are coupled with a memory, and wherein said memory stores instructions which when executed by the one or more processors causes the UE to:

transmit one or more communication requests to a converge telephony exchange server (CTAS) via a network, wherein the LIMS is configured to:

receive the one or more communication requests from the CTAS, wherein the one or more communication requests are based on one or more subscriber inputs received by the CTAS from the UE via the network; transmit the one or more communication requests to a centralized data layer (CDL) server, wherein the CDL server is configured to approve the one or more communication requests; and the approved one or more communication requests from the CDL server and enable the one or more connections between the UE and the CTAS based on the approved one or more communication requests.

15. A non-transitory computer-readable medium comprising processor-executable instructions executable by a processor of a lawful interception management server (LIMS) that is operatively coupled with a convergence telephony exchange server (CTAS) to perform a method, the method comprising:

receiving, by the LIMS, one or more communication requests from the CTAS, wherein the one or more communication requests are based on one or more subscriber inputs received by the CTAS from one or more user devices via a network;

transmitting, by the LIMS, the one or more communication requests to a centralized data layer (CDL) server, wherein the CDL server is configured to approve the one or more communication requests; and receiving, by the LIMS, the approved one or more communication requests from the CDL server and enable the one or more connections between the one or more user devices and the CTAS based on the approved one or more communication requests.

* * * * *